United States Patent Office 3,513,158
Patented May 19, 1970

3,513,158
PROCESS FOR PREPARING 5-ARYL BENZODI-
AZEPINES AND INTERMEDIATES
Earl Reeder, Nutley, Arthur Stempel, Teaneck, and Leo
Henryk Sternbach, Upper Montclair, N.J., assignors to
Hoffmann-La Roche Inc., Nutley, N.J., a corporation
of New Jersey
No Drawing. Continuation-in-part of application Ser. No.
506,129, Nov. 2, 1965. This application Sept. 9, 1966,
Ser. No. 578,153
Int. Cl. C07d 41/00, 41/06, 53/00, 87/54, 93/36
U.S. Cl. 260—239.3        14 Claims

ABSTRACT OF THE DISCLOSURE

Treating an α-oxime of the formula

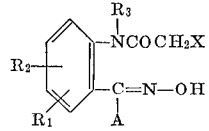

wherein $R_1$ and $R_2$ are hydrogen, halogen, trifluoromethyl and nitro, $R_3$ is hydrogen and lower alkyl, A is phenyl, halophenyl and pyridyl and X is halogen or alkyl or arylsulfonyloxy with a base to obtain the corresponding 4,1,5-benzoxadiazocin-2-one. The last-mentioned compounds are converted, with or without isolation, into the corresponding 3-hydroxy-1,4-benzodiazepin-2-one.

This application is a continuation-in-part of application Ser. No. 506,129 filed Nov. 2, 1965 in the names of Earl Reeder, Arthur Stempel and Leo Henryk Sternbach (now abandoned). The benefit of the filing date of this earlier application is hereby claimed.

This invention relates to novel chemical processes and novel intermediates. More particularly, the present invention relates to novel chemical processes for preparing known products useful as medicinal agents by virtue of their pharmacological activity and to novel intermediates prepared when performing such processes.

The end products resulting from a performance of the novel processes disclosed in the subject application can be characterized broadly in a chemical sense as being 3-hydroxy - 5-aryl-1,4-benzodiazepin-2-ones. Such known products of therapeutic usefulness are of the formula

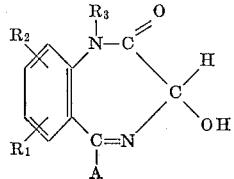

wherein A is selected from the group consisting of $R_4$-phenyl and pyridyl; $R_1$ and $R_2$ are each selected from the group consisting of hydrogen, halogen, trifluoromethyl and nitro; $R_3$ is selected from the group consisting of hydrogen and lower alkyl and $R_4$ is selected from the group consisting of hydrogen and halogen.

The novel chemical process for preparing compounds of the Formula I above involves treating an α-oxime of a 2-leaving group substituted-acetamido benzophenone, i.e. a compound having the formula of

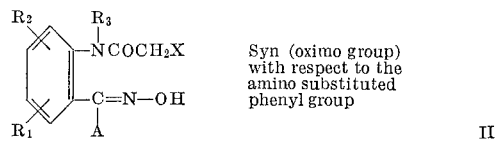

Syn (oximo group) with respect to the amino substituted phenyl group

II wherein A, $R_1$, $R_2$ and $R_3$ have the same meaning as ascribed thereto hereinabove and X is selected preferentially from the group consisting of halogen, e.g. chlorine, bromine and iodine, alkylsulfonyloxy, e.g. mesyloxy and arylsulfonyloxy, e.g. tosyloxy or benzenesulfonyloxy with any suitable base in the presence of a suitable inert organic solvent.

The conversion of compounds corresponding to Formula II above to compounds corresponding to Formula I above proceeds through two steps: the first step being the conversion, i.e. cyclization, of the open compound of the Formula II above into an 8-membered ring-containing intermediate of the formula

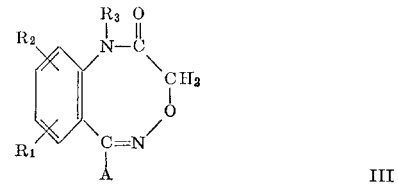

III wherein A, $R_1$, $R_2$ and $R_3$ have the same meaning as above. This compound of the Formula III in the second step of the conversion undergoes rearrangement to the 7-membered ring system of the Formula I above.

The conversion of a compound of the Formula II above to the corresponding compound of the Formula I above can, of course, be conducted either with or without isolation of the intermediate compound of the Formula III above. Thus, a compound of the Formula II above can be treated with a base in the presence of any suitable inert organic solvent and the reaction interrupted whereby isolation of the compound of the Formula III above can be effected. The so-obtained compound of the Formula III above can then be further reacted, if desired, under the same reaction conditions as described above, in connection with the preparation of the compounds of the Formula III, i.e. with a base in the presence of any suitable inert organic solvent, to obtain the corresponding compound of the Formula I above.

On the other hand, a compound of the Formula II above can be treated as described above, i.e. with a base in the presence of any suitable inert organic solvent, until a compound of the Formula I above is obtained, without interrupting the reaction or isolating an intermediate of the Formula III above.

In the treatment of compounds of the Formula II above wherein A is phenyl with a base in the presence of an inert organic solvent, it is preferred to permit the reaction to proceed to the compounds of the Formula I since compounds of the Formula III above wherein A is phenyl facilely undergo rearrangement in the presence of a base. Thus, once such a compound is formed, it can be rearranged quite readily into the corresponding compound of the Formula I above in situ. Accordingly, when compounds of the Formula II above wherein A is phenyl are treated as is noted above, it is preferred to proceed to the corresponding compounds of the Formula I above without interrupting the reaction or isolating the intermediate of the Formula III above.

In the treatment of compounds of the formula II above wherein A is pyridyl, the corresponding intermediates of the Formula III above can be more readily isolated than the corresponding compounds wherein A is phenyl. Thus, in this process aspect, it is a matter of choice whether the reaction be permitted to proceed to a compound of the Formula I above without isolating an intermediate of the Formula III above or interrupted so as to permit isolation of the latter. As is evident from the above, the last-mentioned isolated compound of the Formula III can at some future time be rearranged to the corresponding compound of the Formula I.

The treatment with a base in any of the various steps above, i.e. in the route which follows the path from II→III→I or in the route which goes from II→III and then subsequently from III→I can be effected at room temperature or above or below room temperature. In the most preferred aspect, the reaction is conducted at a temperature range from about 0° C. to about 40° C., more preferably from about 15° C. to about 30° C., most preferentially, at about room temperature. Also, while the amount of base employed is not a critical aspect of the present invention, highest yields of the desired product of the Formula I above are obtained when there is present in the reaction medium above 2 molar equivalents of the base for every one mole of the starting material of the Formula I above utilized. While a halogen group and a sulfonyloxy group is illustrated hereinabove as the leaving group in compounds of the Formula II above, it is, of course, to be understood that any equivalent leaving group can be present in the compounds of the Formula II above in place of the groupings illustrated. All that is required of the leaving group is that it function efficaciously in the process aspect herein disclosed, that is, that it be a suitable leaving group for the purposes of the present invention.

In a preferred aspect, $R_2$ in compounds of the Formulas I, II and III above is hydrogen. In the most advantageous aspect of the present invention, $R_1$ is connected to the fused benzo-portion of the benzodiazepine ring of a compound of the Formula I above in the 7-position thereof (and, correspondingly, in the 4-position of the acetanilide syn-oxime of the Formula II above and in the 8-position of the 4,1,5-benzoxadiazocin-2-ones of the Formula III above). When A is phenyl and $R_4$ is halogen, the last-mentioned halogen group is advantageously joined to the phenyl group in the 2-position thereof. However, when A is phenyl, $R_4$ is preferentially hydrogen. When A is pyridyl, the pyridyl group according to an advantageous aspect of the present invention is connected to the remaining portion of the molecules represented by Formulas I, II and III above in the 2-position of the pyridyl group.

As representative of bases usable in any of the process aspects described above, there may be included alkali metal hydroxides, such as sodium hydroxide, potassium hydroxide, alkaline earth metal hydroxides, such as calcium hydroxide and the like, alkali metal alcoholates such as sodium methoxide, alkali metal hydrides, e.g. sodium hydride, alkali metal amides, e.g. sodamide or any other suitable base. All that is required of the base to be suitable for this process aspect is that it function efficaciously therein, that is, that the treatment therewith of the compounds of Formula II above results in the corresponding compounds of the Formula I above. Most preferred among the many bases which will effect the desired end and alkali metal hydroxides such as, preferentially, sodium hydroxide and alkali metal alcoholates such as sodium methoxide.

As is noted above, the last-mentioned process aspect proceeds in any suitable inert organic solvent. Among the solvents suitable for the present invention may be included lower alkanols such as methanol and ethanol, ethers such as dioxane, dimethoxyethane and tetrahydrofuran and any similar inert organic type solvent. Most preferred are water-miscible inert organic solvents.

Heretofore, it has been disclosed in the literature that the treatment, for example, of the β-oxime of a 2-haloacetamidobenzophenone (anti with respect to the amino-substituted phenyl group) with alkali will result in a compound of the formula

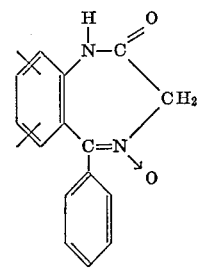

IV

If a 3-hydroxy-5-aryl-1,4-benzodiazepin-2-one of the Formula I above were desired, it was necessary to first react the compound of the Formula IV above with an acylating agent whereby to obtain a product of the formula

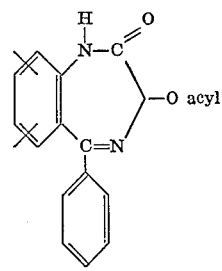

V and to, thereafter, hydrolize the compound of the Formula V above to remove the acyl group and effect the preparation of the 3-hydroxy compound of the Formula I above. The present applicants have unexpectedly discovered that 3-hydroxy-5-aryl-benzodiazepin-2-ones of the Formula I above can be prepared in good yields by the process described with particularity herein. It is this unexpected and unpredictable discovery which constitutes the present invention. Furthermore, prior art techniques were not particularly suited for preparing compounds of the Formula I above wherein A is pyridyl. Accordingly, one of the particularly salient features of the present invention is that it provides a facile approach to compounds of the Formula I above wherein A is pyridyl.

The term "halogen" as used throughout the disclosure is intended to encompass all four forms thereof, i.e. chlorine, fluorine, bromine and iodine, unless otherwise specified. When $R_1$ connotes halogen, preferred among the halogens are chlorine and bromine. When $R_4$ designates halogen, preferred thereamong is fluorine. The term "lower alkyl" as used throughout the disclosure comprehends both straight and branched chain hydrocarbon groups such as methyl, ethyl, N-propyl, isopropyl and the like. The term "alkylsulfonyl" connotes a sulfonyl grouping having a straight or branched chain lower alkyl group joined thereto, e.g. mesyl. The term "aryl sulfonyl" connotes a sulfonyl group having, preferentially phenyl or a substituted phenyl, e.g. with lower alkyl or a naphthyl group joined thereto such as benzene sulfonyl or tosyl. As is evident from the above the term "aryl" as employed herein is intended to connote preferentially a phenyl group, a substituted phenyl group, e.g. a lower alkyl phenyl group, such as tolyl and the like.

Compounds of the Formula III above in addition to being useful as intermediates in the preparation of compounds of pharmaceutical value are also useful as sedative, muscle relaxant and anti-convulsant agents. Compounds of the Formula III above wherein A is pyridyl are novel and, hence, constitute a part of the present invention. Such compounds can be represented by the formula

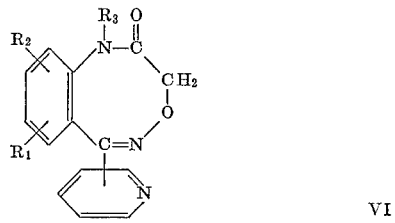

VI wherein $R_1$ and $R_2$ are selected from the group consisting of hydrogen, halogen, trifluoromethyl and nitro, and $R_3$ is selected from the group consisting of hydrogen and lower alkyl. Preferred among the compounds of the Formula VI above are compounds wherein the 6-pyridyl group is joined to the benzoxadiazocine nucleus at the 2-position of the pyridyl group. More preferred are those compounds of the Formula VI above wherein $R_2$ is hydrogen and $R_1$ is halogen and is joined to the benzoxadiazocine nucleus at the 8-position thereof. Most preferred are compounds of the Formula VI above as last-mentioned wherein $R_1$ is bromine or chlorine.

The foregoing is a general description of a new and useful process for the preparation of pharmaceutically desirable 1,4-benzodiazepin-2-ones bearing a hydroxyl group in position-3 via intermediates containing an 8-membered ring structure, certain of which are novel and are useful utilizing a readily available starting material. It should be readily apparent to those skilled in the art that variations in these procedures are possible. Furthermore, it can be recognized from the above that by the process described above, there is provided a facile route to 3-hydroxy-benzodiazepin-2-ones. In the past, to prepare these compounds, multiple steps involving time consuming techniques were required. Additionally, the 5-pyridyl-group containing compounds are difficultly obtainable by prior art routes. The present invention on the other hand provides these 3-hydroxy compounds in good yields and utilizing starting materials which are conveniently available.

The following examples are illustrative but not limitative of the procedures for the preparation of the said pharmaceutically useful 3-hydroxy-1,4-benzodiazepin-2-ones and 4,5-benzoxadiazocines, certain of which are novel, which constitute the present invention. All temperatures stated are in degrees centigrade.

EXAMPLE 1

To a solution of 20 grams (61.9 mmoles) of 2'-benzoyl-2,4'-dichloroacetanilide syn oxime (the α-form) in 190 ml. of dioxane, 62 ml. of 1 N sodium hydroxide was added carefully with stirring. Stirring of the reaction mixture was continued for 20 hours. The reaction mixture was then filtered. The so-obtained dioxane filtrate was concentrated under reduced pressure to remove dioxane with the simultaneous addition of water. The so-concentrated filtrate was extracted with chloroform. The chloroform extract was washed with water, dried over sodium sulfate and concentrated to dryness under reduced pressure. Crystallization of the so-obtained residue from a mixture of methylene chloride and hexane gave crude 7-chloro-1,3-dihydro-3-hydroxy-5-phenyl-2H-1,4-benzodiazepin-2-one. Recrystallization from ethanol further purified the product.

EXAMPLE 2

To a solution of 25 grams (77.4 mmoles) of 2'-benzoyl-2,4'-dichloroacetanilide syn oxime (the α-form) in 238 ml. of dioxane, there was carefully added with stirring 77.4 ml. of 2 N sodium hydroxide over a period of 10 minutes. After permitting the reaction mixture to stand for 22 hours, a product which had crystallized was separated by filtration. The said product was washed with methanol and dried to give the sodium salt of 7-chloro-1,3-dihydro-3-hydroxy-5-phenyl-2H-1,4-benzodiazepin-2-one melting at 220–238° dec. The crude product was extracted with hot chloroform leaving a material which melted at 210–225° dec. Crystallization of the last-mentioned material from aqueous ethanol acidified to about pH 1–2 with diluted hydrochloric acid yielded 7-chloro-1,3-dihydro-3-hydroxy-5-phenyl-2H-1,4-benzodiazepin-2-one.

The dioxane filtrate obtained in the first stages of the procedure described above was neutralized with acetic acid and concentrated under reduced pressure to remove dioxane with the simultaneous addition of water. On partitioning the water insoluble residue with chloroform and water, an insoluble material formed which was separated by filtration and was found to be crude 7-chloro-1,3-dihydro-3-hydroxy-5-phenyl-2H-1,4-benzodiazepin-2-one.

EXAMPLE 3

To a solution of 10 g. (27.2 mmoles) of 2'-benzoyl-2-bromo-4'-chloroacetanilide syn-oxime in 95 ml. of dioxane, 31 ml. of 2 N sodium hydroxide was added while stirring. After 18 hrs. at room temperature, the resultant mixture was filtered and the filtrate acidified with dilute hydrochloric acid of to pH 1.6. The so-acidified medium was filtered. The filtrate was concentrated under reduced pressure, while adding water, to remove dioxane. On addition of 100 ml. of chloroform to the aqueous residue, a solid separated. This was separated by filtration to give 7-chloro-1,3-dihydro-3-hydroxy-5-phenyl-2H-1,4-benzodiazepin-2-one. The product was recrystallized from aqueous dimethylformamide to purify same.

EXAMPLE 4

A solution of 10 g. (40 mmoles) of 2-amino-5-chloro-4'-hydroxybenzophenone and 5.6 g. (80 mmoles) of hydroxylamine hydrochloride in a mixture of 55 ml. of ethanol and 7 ml. of pyridine was stirred and refluxed for 20 hrs. Solvent was removed by distillation under reduced pressure and the residue was partitioned between water and ether. The organic phase was washed with water, dried over anhydrous sodium sulfate and concentrated to dryness. Warming the residue with benzene gave crystalline 2-amino-5-chloro-4'-hydroxybenzophenone syn oxime melting at 151–153°. Recrystallization from a mixture of ethyl acetate and hexane gave colorless rhombs of the product melting at 151–153°.

A solution of 16.1 g. (61 mmoles) of 2-amino-5-chloro-4'-hydroxybenzophenone syn-oxime in 500 ml. of ether was stirred with 200 ml. of water and cooled in an ice bath to 0–5°. Chloroacetyl chloride (5.1 ml., 67 mmoles) was carefully added while maintaining the reaction mixture slightly basic by the addition of 5% sodium bicarbonate. The reaction was stirred for 30 min. after all of the acid chloride had been added. The ether layer was separated, washed with water, dried over sodium sulfate and concentrated to dryness. The residue was crystallized from a mixture of ethyl acetate and hexane to give crude 2,4'-dichloro-2'-(4-hydroxybenzoyl)acetanilide syn oxime melting at 135–150° dec. Recrystallization from acetonitrile gave a pure sample melting at 169–170° dec.

To a solution of 7.2 g. (21.3 mmoles) of 2,4'-dichloro 2'-(4-hydroxybenzoyl)acetanilide syn-oxime in 75 ml. of dioxane, 31.8 ml. of 2 N sodium hydroxide was added. A solid began to form within 15 min. After stirring overnight, the solid that formed was separated by filtration. The said solid material was dissolved in water and acidified by the addition of 3 N hydrochloric acid. A crystalline solid separated, M.P. 149–150°. Recrystallization from aqueous dioxane gave 7-chloro-1,3-dihydro-3-hydroxy-5-(4-hydroxyphenyl)-2H-1,4-benzodiazepin-2-one melting at 178–179°.

EXAMPLE 5

A solution of 5 g. (20 mmoles) of 2-amino-5-chlorobenzophenone syn-oxime in 100 ml. of dioxane was cooled to 12° and 1.6 ml. (2.4 g., 21 mmoles) of chloroacetyl chloride was added dropwise over 40 min. while keeping the reaction mixture slightly basic by simultaneous addition of 10% sodium hydroxide. After an additional 45 min. period, 20.3 ml. of 2 N sodium hydroxide was added and stirring was continued at room temperature for 20 hrs. Filtration separated a solid melting at 196–255° dec. The solid was dissolved in 50% aqueous ethanol (pH 11.5) and acidified to pH 2.2 by addition of 3 N hydrochloric acid. The crystalline product that formed was separated by filtration to yield 7-chloro-1,3-dihydro-3-hydroxy-5-phenyl-2H-1,4-benzodiazepin - 2 - one melting at 195–196°.

EXAMPLE 6

To a solution of 5 g. (15 mmoles) of 2'-benzoyl-2,4'-dichloroacetanilide syn-oxime in 200 ml. of dioxane, 15 ml. of 2 N sodium hydroxide was added and the mixture stirred for 3 hrs. at room temperature. On addition of 200 ml. of water to the clear yellow solution, a white precipitate formed which was removed by filtration (M.P. 296–9° dec.). The filtrate was acidified to pH 6 by addition of 3 N hydrochloric acid and dioxane was removed by distillation under reduced pressure. The yellow oil that separated was extracted with methylene chloride and after drying over sodium sulfate, the organic solvent was distilled off. Crystallization of the residue from benzene gave a material melting at 165–166°. On addition of hexane to the filtrate, a small amount of amorphous material separated which was removed by decanting the clear liquid. Further addition of hexane resulted in crystallization of a material melting at 122–135° which was separated by filtration. Concentration of the so-obtained filtrate to dryness and crystallization of the residue from benzene gave 8 - chloro - 1,3-dihydro-6-phenyl-2H-4,1,5-benzoxadiazocin-2-one melting at 197–199°.

A solution of 1 g. of 8-chloro-1,3-dihydro-6-phenyl-2H-4,1,5-benzoxadiazocin-2-one in 50 ml. of methanol containing 2.5 ml. of 2.79 N sodium methoxide in methanol was stirred for 3 hrs. at room temperature. The solid that formed was separated by filtration (M.P. 196–210° dec.) and dissolved in 50% aqueous ethanol. On acidification to pH 2 with 3 N hydrochloric acid 7-chloro-1,3-dihydro-3-hydroxy-5-phenyl-2H-1,4-benzodiazepin-2-one (M.P. 198–200°) crystallized. An additional quantity of the product was isolated from the methanol mother liquors after acidification.

The same procedure as described above was repeated except that there was employed respectively as a starting material:

(1) 2-bromo-2'-benzoyl-4'-chloro-acetanilide syn-oxime (M.P. 148–149°); and (2) 2'-benzoyl-4'-chloro-2-iodoacetanilide (M.P. 146–148°) rather than the 2'-benzoyl-2,4'-dichloroacetanilide syn-oxime specified hereinabove.

EXAMPLE 7

To a solution of 20 g. (62 mmoles) of 2'-benzoyl-2,4'-dichloroacetanilide syn-oxime in 300 ml. of dioxane, 125 ml. of 2 N sodium hydroxide was added. After stirring for 15 hrs. the solid that formed was separated by filtration to yield a sodium salt of 7-chloro-1,3-dihydro-3-hydroxy-5-phenyl-2H-1,4-benzodiazepin - 2 - one melting at 180–260°. During this reaction there was first prepared 8-chloro-1,3-dihydro-6-phenyl - 2H - 4,1,5-benzoxadiazocin-2-one. The acid sodium salt was dissolved in 350 ml. of 70% ethanol, filtered to remove a small amount of insoluble material and the filtrate then acidified to pH 1.5 by the addition of 3 N hydrochloric acid. The crystalline product that formed was separated by filtration to give 7-chloro-1,3-dihydro-3-hydroxy - 5 - phenyl-2H-1,4-benzodiazepin-2-one melting at 191–193.5°. A second crop formed on standing, M.P. 179–183°.

The dioxane solution obtained in the original filtration was acidified to pH 1.6 by addition of 3 N hydrochloric acid. It was then concentrated under reduced pressure to remove dioxane. The residue was partitioned between chloroform and water. Filtration separated crude 7-chloro-1,3-dihydro-3-hydroxy-5-phenyl - 2H - 1,4-benzodiazepin-2-one melting point 171–176° that formed at the interface. The crude fractions were purified by crystallization from aqueous dimethylformamide to give 7-chloro-1,3-dihydro-3-hydroxy-5-phenyl-2H - 1,4 - benzodiazepin-2-one melting at 196–197.5° dec.

EXAMPLE 8

2' - benzoyl-2-chloro-4'-trifluoromethylacetanilide syn-oxime of M.P. 174–176° was converted as described in Example 7 into 1,3-dihydro-3-hydroxy - 5 - phenyl-7-trifluoromethyl-2H-1,4-benzodiazepin-2-one via the 1,3-dihydro-6-phenyl-8-trifluoromethyl-2H - 4,1,5 - benzoxadiazocin-2-one of melting point 212–214° after recrystallization from methanol.

EXAMPLE 9

In the manner described in Example 4, 2'-benzoyl-4'-chloro - 2 - (p-tolylsulfonyloxy)acetanilide syn-oxime of M.P. 159–160° was prepared via the reaction of tosyloxyacetyl chloride with 2-amino-5-chloro benzophenone syn-oxime. The so-formed syn-oxime was converted into 7-chloro-1,3-dihydro-3-hydroxy - 5 - phenyl-2H-1,4-benzodiazepin-2-one via the 8-chloro-1,3-dihydro-6-phenyl-2H-4,1,5-benzoxadiazocin-2-one intermediate in the manner described in Example 7.

EXAMPLE 10

Reacting 2-amino-5-chlorobenzophenone with mesyloxyacetyl chloride as described in Example 4 yielded 2'-benzoyl-4'-chloro-2-mesyloxyacetanilide syn-oxime, M.P. 136–138° after recrystallization from methylene chloride/hexane. The so-formed syn-oxime was converted into 7-chloro-1,3-dihydro-3-hydroxy-5-phenyl - 2H - 1,4-benzodiazepin-2-one via the 8-chloro-1,3-dihydro-6-phenyl-2H-4,1,5-benzoxadiazocin-2-one intermediate as described in Example 7.

EXAMPLE 11

Utilizing the technique described above in Example 4 starting with 2-amino-(5 - chloro)-benzophenone syn-oxime, there was obtained 2'-benzoyl-2-chloroacetanilide syn-oxime, M.P. of 136–137° after recrystallization from methylene chloride/hexane. Treatment of the syn-oxime with a base as described above in Example 7 yielded 1,3-dihydro-3-hydroxy-5-phenyl-2H - 1,4 - benzodiazepin-2-one, via the 1,3-dihydro-6-phenyl-2H - 4,1,5 - benzoxadiazocin-2-one of M.P. 236–238° (after recrystallization from methanol).

EXAMPLE 12

A solution of 3 g. (9 mmoles) of 2'-benzoyl-2-chloro-4'-nitroacetanilide syn-oxime in 150 ml. of dioxane and 18 ml. of 2 N sodium hydroxide was stirred for 15 hrs. at room temperature. After addition of 150 ml. of water, 3 N hydrochloric acid was added to bring the pH to 5. Dioxane was then removed by distillation under reduced pressure and the residue was partitioned between water and methylene chloride. After separating the organic layer, it was dried over sodium sulfate and the solvent then concentrated by distillation under reduced pressure. A solid formed and was removed by filtration (M.P. 185–190° dec.). The filtrate was concentrated to dryness and the residue triturated with ether. The solid obtained on filtration (M.P. 247–249°) was recrystallized from a mixture of methylene chloride and hexane to give 1,3-dihydro-8-nitro-6-phenyl-2H - 4,1,5 - benzoxadiazocin-2-one, M.P. 254–255°. The solid of melting point 185–190° dec. obtained as above was also triturated with ether giving 1,3-dihydro-3-hydroxy-7-nitro - 5 - phenyl-2H-1,4- benzodiazepin-2-one melting at 214–215° dec. Recrystallization from acetonitrile did not alter the melting point.

EXAMPLE 13

A solution of 20 g. (62 mmoles) of 2'-benzoyl-2,4'-dichloroacetanilide syn-oxime in a mixture of 400 ml. of ethanol and 125 ml. of 2 N sodium hydroxide was stirred for 2 hrs. at room temperature. The solid that separated was removed by filtration, M.P. 200–220° dec. The solid was dissolved in 300 ml. of 66% aqueous ethanol (pH 11.8) and acidified to pH 1.8 with 3 N hydrochloric acid. Filtration separated 7-chloro-1,3-dihydro - 3 - hydroxy-5-phenyl-2H-1,4-benzodiazepin-2-one, M.P. 197–198° dec.

EXAMPLE 14

To a solution of 21 g. (56 mmoles) of 4'-bromo-2-chloro-2'-picolinoylacetanilide syn-oxime in 700 ml. of dioxane, 39.9 ml. of 2.79 N sodium methoxide was added and the solution was stirred for 20 hours at room temperature. After filtration to remove a small amount of gelatinous material, the filtrate was diluted with water and acidified to pH 4.1 by addition of 3 N hydrochloric acid. A light yellow solid crystallized and was separated by filtration (M.P. 322–3° dec.). Dioxane was removed by distillation of the filtrate under reduced pressure and the residue was partitioned between chloroform and water. The organic layer was dried over sodium sulfate, concentrated to a small volume, then dissolved in ethyl acetate and passed through a column of "Florisil" (14 x ¾"). On concentration of the ethyl acetate eluates, 8-bromo-1,3-dihydro-6-(2-pyridyl)-2H - 4,1,5 - benzoxadiazocin-2-one crystallized, M.P. 225–228°. Recrystallization from a mixture of tetrahydrofuran and hexane gave colorless rods of the product melting at 229–231°. Continued elution with ethyl acetate separated a second fraction which on concentration gave crystals. Recrystallization of the material from acetonitrile yielded a product which was separated by filtration.

The acetonitrile filtrate crystallized yielding 7-bromo-1,3-dihydro-3-hydroxy-5-(2-pyridyl)-2H - 1,4 - benzodiazepin-2-one, M.P. 198–200° dec. Recrystallization from a mixture of tetrahydrofuran and hexane followed by drying at 100° gave the product in analytically pure form.

EXAMPLE 15

To a solution of 3.0 g. (9 mmoles) of 8-bromo-1,3-dihydro-6-(2-pyridyl)-2H-4,1,5-benzoxadiazocin-2-one in 300 ml. of dioxane, 9 ml. of 2 N sodium hydroxide were added and the reaction mixture was then stirred for 20 hours. An equal volume of water was added and the pH was brought to 3.95 by addition of 3 N hydrochloric acid. Dioxane was then removed by distillation at reduced pressure. A yellow solid that formed was separated by filtration. The aqueous filtrate was extracted with methylene chloride and the organic layer was concentrated to dryness after drying over sodium sulfate. On addition of benzene to the oily residue, a crystalline material melting at 183–184° was obtained. Recrystallization from acetonitrile of this material gave 7-bromo-1,3-dihydro-3-hydroxy-5-(2 - pyridyl)-2H-1,4-benzodiazepin-2-one, M.P. 197–198°.

What is claimed is:

1. A process which comprises treating an α-oxime of a 2-acetamido-benzophenone of the formula

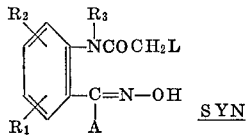

wherein A is selected from the group consisting of R$_4$-phenyl and pyridyl; R$_1$ and R$_2$ are selected from the group consisting of hydrogen, halogen, trifluoromethyl and nitro; R$_3$ is selected from the group consisting of hydrogen and lower alkyl; R$_4$ is selected from the group consisting of hydrogen and halogen and X is a leaving group selected from the group consisting of halogen, loweralkylsulfonyloxy, tosyloxy and benzenesulfonyloxy, with a base in the presence of an inert organic solvent whereby to prepare a compound of the formula

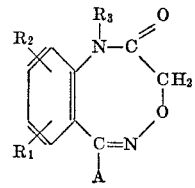

wherein A, R$_1$, R$_2$ and R$_3$ have the same meaning as above as an intermediate.

2. A process as defined in claim 1 wherein the base utilized is an alkali metal hydroxide.

3. A process as defined in claim 1 wherein X is selected from the group consisting of chlorine, bromine, iodine, lower alkylsulfonyloxy and tosyloxy and benzenesulfonyloxy.

4. A process as defined in claim 1 wherein in the compounds of Formula I, R$_2$ and R$_3$ are hydrogen; R$_1$ is halogen and is joined to the benzophenone α-oxime of the Formula I at the 5-position thereof.

5. A process as defined in claim 4 wherein L is halogen selected from the group consisting of chlorine, bromine and iodine.

6. A process as defined in claim 5 wherein the base utilized is an alkali metal hydroxide.

7. A process as defined in claim 4 wherein R$_1$ is chlorine.

8. A process as defined in claim 7 wherein the base utilized is sodium hydroxide.

9. A process as defined in claim 11 wherein the intermediate of the formula

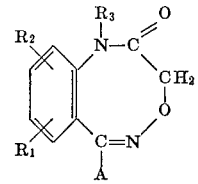

wherein A is selected from the group consisting of R$_4$-phenyl and pyridyl; R$_1$ and R$_2$ are selected from the group consisting of hydrogen, halogen, trifluoromethyl and nitro; R$_3$ is selected from the group consisting of hydrogen and lower alkyl and R$_4$ is selected from the group consisting of hydrogen and halogen is cyclized, with or without isolation from the reaction medium, to the corresponding compound of the formula

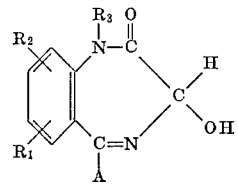

wherein R$_1$, R$_2$, R$_3$ and A are as above.

10. A compound for the formula

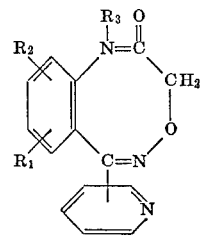

wherein R$_1$ and R$_2$ are selected from the group consisting of hydrogen, halogen, trifluoromethyl and nitro; and R$_3$ is selected from the group consisting of hydrogen and lower alkyl.

11. A compound as defined in claim 10 wherein the pyridyl group is joined to the benzoxadiazocine nucleus at the 2-position of the pyridyl group.

12. A compound as defined in claim 10 wherein $R_2$ is hydrogen and $R_1$ is halogen and is joined to the fused benzo-portion of the benzoxadiazocine nucleus at the 8-position thereof.

13. A compound as defined in claim 10 wherein the pyridyl group is joined to the benzoxadiazocine nucleus at the 2-position of the pyridyl group; $R_2$ is hydrogen and $R_1$ is halogen and is joined to the fused benzo-portion of the benzoxadiazocine nucleus at the 8-position thereof.

14. A compound as defined in claim 13 wherein $R_1$ is bromine.

References Cited

UNITED STATES PATENTS 3,299,053  1/1967  Archer et al. _____ 260—239.3

HENRY R. JILES, Primary Examiner

R. T. BOND, Assistant Examiner

U.S. Cl. X.R.

424—244

PO-1050
(5/69)

UNITED STATES PATENT OFFICE
CERTIFICATE OF CORRECTION

Patent No. 3,513,158            Dated May 19, 1970

Inventor(s) Earl Reeder, Arthur Stempel and Leo Henryk Sternbach

It is certified that error appears in the above-identified patent and that said Letters Patent are hereby corrected as shown below:

Column 10, line 35 - "11" should be -- 1 --.

(Our Amendment dated June 18, 1968).

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents